(12) United States Patent
Barsness et al.

(10) Patent No.: US 8,732,300 B2
(45) Date of Patent: May 20, 2014

(54) APPLICATION MONITORING IN A STREAM DATABASE ENVIRONMENT

(75) Inventors: Eric L. Barsness, Pine Island, MN (US); Ryan K. Cradick, Oronoco, MN (US); Michael D. Pfeifer, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/987,335

(22) Filed: Jan. 10, 2011

(65) Prior Publication Data

US 2012/0179809 A1      Jul. 12, 2012

(51) Int. Cl.
| G06F 15/173 | (2006.01) |
| G06F 15/16 | (2006.01) |
| H04L 12/24 | (2006.01) |
| H04L 29/08 | (2006.01) |
| H04L 29/06 | (2006.01) |

(52) U.S. Cl.
CPC .......... *H04L 29/08072* (2013.01); *H04L 29/06* (2013.01); *H04L 41/22* (2013.01); *H04L 41/12* (2013.01)
USPC .......................................... 709/224; 709/223

(58) Field of Classification Search
USPC ................. 709/223, 224, 226; 713/1
See application file for complete search history.

(56) References Cited

U.S. PATENT DOCUMENTS

| 6,016,503 | A * | 1/2000 | Overby et al. ................. 718/104 |
| 6,269,368 | B1 * | 7/2001 | Diamond .............................. 1/1 |
| 6,445,682 | B1 * | 9/2002 | Weitz .............................. 370/257 |
| 6,516,350 | B1 * | 2/2003 | Lumelsky et al. ............ 709/226 |
| 6,698,017 | B1 * | 2/2004 | Adamovits et al. ........... 717/168 |
| 7,149,975 | B1 * | 12/2006 | Johnson et al. ................ 715/734 |
| 7,487,206 | B2 * | 2/2009 | Gu et al. ........................ 709/203 |
| 7,596,620 | B1 * | 9/2009 | Colton et al. .................. 709/226 |
| 7,921,686 | B2 * | 4/2011 | Bagepalli et al. ............... 70/223 |
| 8,060,614 | B2 * | 11/2011 | Goldstein et al. ............. 709/226 |
| 8,286,191 | B2 * | 10/2012 | Amini et al. .................. 709/227 |
| 8,434,087 | B2 * | 4/2013 | Degenaro et al. ............. 709/226 |
| 8,478,800 | B1 * | 7/2013 | Johnson et al. ............... 707/827 |
| 2004/0128342 | A1 * | 7/2004 | Maes et al. .................... 709/200 |
| 2005/0251568 | A1 * | 11/2005 | Zavgren ........................ 709/223 |
| 2006/0026275 | A1 * | 2/2006 | Gilmour et al. ............... 709/223 |

(Continued)

OTHER PUBLICATIONS

Ganguly, Processing Set Expressions over Continuous Update Streams, SIGMOD 2003, Jun. 9-12, 2003, San Diego, California, pp. 265-276.*

(Continued)

*Primary Examiner* — Andrew Nalven
*Assistant Examiner* — Walter Malinowski
(74) *Attorney, Agent, or Firm* — Patterson & Sheridan LLP

(57) ABSTRACT

Methods and systems for monitoring a stream application are disclosed. The stream application is composed from a plurality of processing elements executing on one or more compute nodes. A graphical user interface display presents a user with at least a portion of an operator graph in a running stream application. The operator graph represents the plurality of processing elements, and links between processing elements, corresponding to a flow of data tuples through the stream application. A monitoring application then monitors user interactions with the presentation of the portion of the operator graph on the graphical user interface display and identifies at least a first modification to the stream application based on a processing state of the stream application and the monitored user interactions.

16 Claims, 6 Drawing Sheets

(56) References Cited

U.S. PATENT DOCUMENTS

| | | | | |
|---|---|---|---|---|
| 2006/0092467 | A1* | 5/2006 | Dumitrescu et al. | 358/1.15 |
| 2007/0124450 | A1* | 5/2007 | Oba et al. | 709/223 |
| 2007/0162268 | A1* | 7/2007 | Kota et al. | 703/14 |
| 2007/0206630 | A1* | 9/2007 | Bird | 370/465 |
| 2009/0070767 | A1* | 3/2009 | Garbow et al. | 718/104 |
| 2009/0132335 | A1* | 5/2009 | Pein | 705/10 |
| 2009/0313614 | A1* | 12/2009 | Andrade et al. | 717/151 |
| 2009/0319687 | A1* | 12/2009 | Goldstein et al. | 709/241 |
| 2009/0327784 | A1* | 12/2009 | Shah et al. | 713/340 |
| 2010/0106817 | A1* | 4/2010 | Jang | 709/223 |
| 2010/0198807 | A1* | 8/2010 | Kuno et al. | 707/713 |
| 2010/0223305 | A1* | 9/2010 | Park et al. | 707/814 |
| 2010/0287295 | A1* | 11/2010 | Schaffa et al. | 709/231 |
| 2011/0078227 | A1* | 3/2011 | McAloon et al. | 709/201 |
| 2011/0126200 | A1* | 5/2011 | Krieger et al. | 718/102 |
| 2012/0259910 | A1* | 10/2012 | Andrade et al. | 709/201 |
| 2012/0297391 | A1* | 11/2012 | Andrade et al. | 718/102 |

OTHER PUBLICATIONS

Dylan, An Analysis of Stream processing Languages, Department of Computing, Macquarie University, Sydney, Australia, May 24, 2009, pp. 1-38.*
Gedik, Spade: The System S Declarative Stream Processing Engine, SIGMOD '08, Jun. 9-12, 2012, Vancouver, BC, Canada, pp. 1123-1134.*
Schmidt, Quality-of-Service Data Stream Processing, Dissertation, Dresden Technical University, Germany, Mar. 13, 2007, 227 pages.*
Lakshmanan, Placement Strategies for Internet-Scale Data Stream Systems, IEEE Internet Computing, 2008, pp. 50-60.*
Peterson, Advanced Computing Architectures for Cognitive Processing, Air Force Research Laboratory, Rome New York, AFRL-RI-RS-TR-2009-181, Jul. 2009, 123 pages.*
Isard, Distributed Data-Parallel Computing Using a High-Level Programming Language, SIGMOD '09, Jun. 29-Jul. 2, 2009, Providence, Rhode Island, pp. 987-994.*

* cited by examiner

APPLICATION MONITORING IN A STREAM DATABASE ENVIRONMENT

BACKGROUND

While computer databases have become extremely sophisticated, the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems. And products are available which allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

SUMMARY

Embodiments of the invention provide techniques for monitoring and adjusting a stream based application. For example, one embodiment of the invention includes a method for managing a stream application, stream application composed from a plurality of processing elements executing on one or more compute nodes. The method itself may generally include generating a graphical user interface display presenting at least a portion of an operator graph. The operator graph represents the plurality of processing elements, and links between processing elements, corresponding to a flow of data tuples through the stream application. This method may also include monitoring user interactions with the presentation of the portion of the operator graph on the graphical user interface display and identifying at least a first modification to the stream application based on a processing state of the stream application and the monitored user interactions.

Another embodiment of the invention includes a computer readable storage medium containing a program which, when executed, performs an operation of monitoring a stream application. The stream application may be composed from a plurality of processing elements executing on one or more compute nodes. The operation itself may generally include generating a graphical user interface display presenting at least a portion of an operator graph. The operator graph represents the plurality of processing elements, and links between processing elements, corresponding to a flow of data tuples through the stream application. The operation may further include monitoring user interactions with the presentation of the portion of the operator graph on the graphical user interface display and identifying at least a first modification to the stream application based on a processing state of the stream application and the monitored user interactions.

Still another embodiment of the invention includes a system having a plurality of compute nodes, each including a processor and a memory. The compute nodes are configured to execute processing elements of a stream application. They system may also include a management system, also having at least a processor and a memory. The memory on the management system stores a monitoring application, which, when executed on the management system, is configured to perform an operation for monitoring the stream application. The operation itself may generally include generating a graphical user interface display presenting at least a portion of an operator graph. The operator graph represents the plurality of processing elements, and links between processing elements, corresponding to a flow of data tuples through the stream application. The operation may further include monitoring user interactions with the presentation of the portion of the operator graph on the graphical user interface display and identifying at least a first modification to the stream application based on a processing state of the stream application and the monitored user interactions.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

DETAILED DESCRIPTION

Figure 1A:
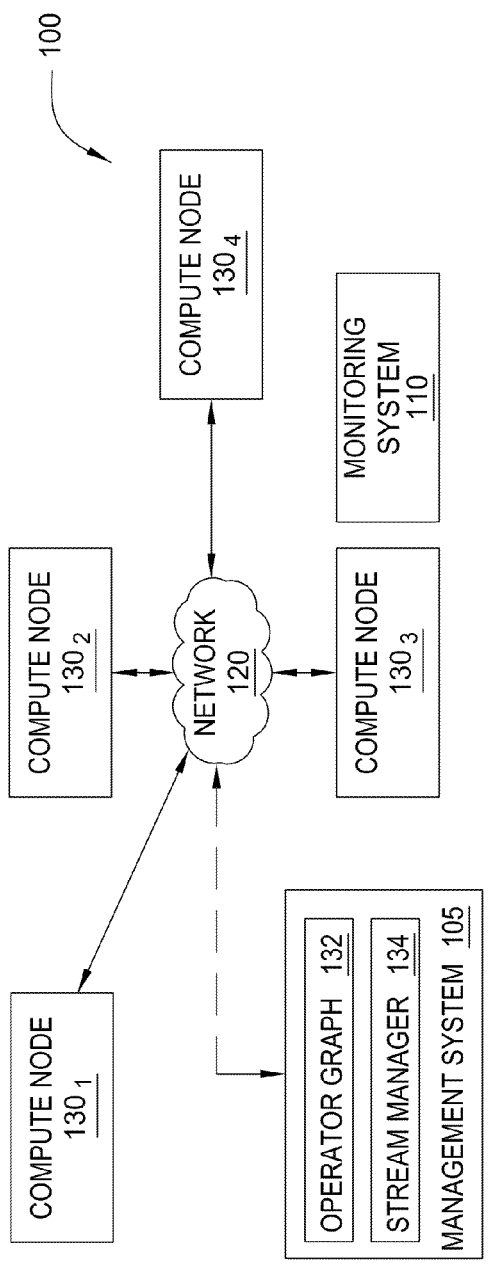
FIGS. 1A-1B illustrate logical diagrams of computing infrastructure configured to execute a stream application, according to one embodiment of the present invention.

Typically, data collected from data sources is stored in one or more databases and then the data is retrieved by processing applications for processing. However, in scenarios where the incoming data flow is huge, it becomes inefficient to follow the approach of first storing the incoming data in a database and then retrieving the data from the database for processing. The problem becomes acute when the incoming data need to be processed in real-time, because huge volumes of data cannot be stored and retrieved without losing the real-time characteristics of the data processing.

Further, in many data processing scenarios, such as real-time monitoring, generally there is no need for storing the incoming data, or at least storing all the incoming data. Moreover, some data processing applications are concerned with summaries of data rather than each individual incoming data record. Still further, some data processing scenarios require comparative analysis of the incoming data with the previous values of some selected attributes. Hence, storing all incoming data is unnecessary. In such scenarios, the traditional approach of data processing fails to yield desired results with regards to scalability, efficiency and real-time data processing.

However, processing the incoming data without first storing the data in a database creates challenges in term of application monitoring and detecting performance issues in stream applications. Traditionally, monitoring and fault detection systems rely on stored data because inserting a monitoring system in data flow channels would reduce overall system efficiency. However, working on stored data would not yield desired results where fault detections need to be fixed in real-time.

In a stream data processing application, operators are connected to one another such that data flows from one processing element (PE) to the next (e.g., over a TCP/IP socket). Scalability is achieved by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application.

In one embodiment, processing elements (and operators) may be configured to collect pre-defined statistical data related to data stream that flows through processing elements according to predefined configurations. The data is then used by a monitoring application in conjunction with how a user interacts with a representation of an operator to identify possible changes to the stream application that may help to optimize the performance of the stream application. That is, a monitoring application may be configured to modify a stream application based on of how the user interacts with a representation of the operator graph presented in a graphical user interface. The monitoring application may be configured to automatically modify the stream application in some cases or to prompt the user with suggested modifications. The graphical representation of the operator graph may present not only how the job's PEs are connected to each other but may also allow the user to access logs, parts of a log, and performance metrics associated with the processing elements, operators, nodes, and data flows of a stream application.

For example, assume a user is looking at the operator graph and is always focused on a part of the graph which presents the performance metrics of tuples in and tuples out of a particular processing element. In such a case, the motioning application may determine that the user is interested in the tuple flow at that part of the graph. In response, the monitoring application could then increase the priority of the PE in question or even move the PE to separate machines to gain more resource, assuming that the user responds favorably to prompts suggesting such changes to increase performance. Similarly, the monitoring application could be configured to clone a given PEs if it is determined that the user is focused on a part of the graph that may be running too slowly to process data tuples through the stream. Similarly still, the monitoring application could also evaluate the historical information associated with prior executions of the PE's at a node and determine that the current rates have slowed. Looking at the historical information just adds more certainty to automated or prompting decision to adjust a PE, clone a PE, etc.

As another example, assume the end user is constantly viewing a log file associated with a processing element and has filtered the log view to show only one or more of the operators within a log file. In such a case, the monitoring application may re-fuse the processing elements so that the log file contains only information that the user appears to be interested in viewing. Of course, the monitoring application could also fuse operators and PE's in response to observations of how the user interacts with a GUI screen.

As noted, the monitoring application could be configured to make such adjustments to the stream application automatically, or in response to prompting the user. As yet another example, assume an end user is looking at PE's running on a specific node and accessing system log files. In such a case, the monitoring application may identify modifications to the stream application that would enhance the performance of a particular node by adding more resources to that node. For example, the memory and/or machine processing power supplied to a node could be added to a node to that node. This would occur where the system is logically configured from a larger physical machine (e.g., as a set of virtual machines managed by a hypervisor).

As yet another example, assume an end user is reading log files. In such a case, the monitoring application could turn on additional tracing in the log file or set of log files that are connected to a given PE. Likewise the monitoring application could remove tracing (or step down a logging level) if the user appears to be focused on only certain levels of information. In some cases, the monitoring application could even determine to temporarily remove part of the operator graph. This option would likely be prompted and not automatic as it could have substantial impacts on the data flowing through a stream application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider.

Figure 1B:
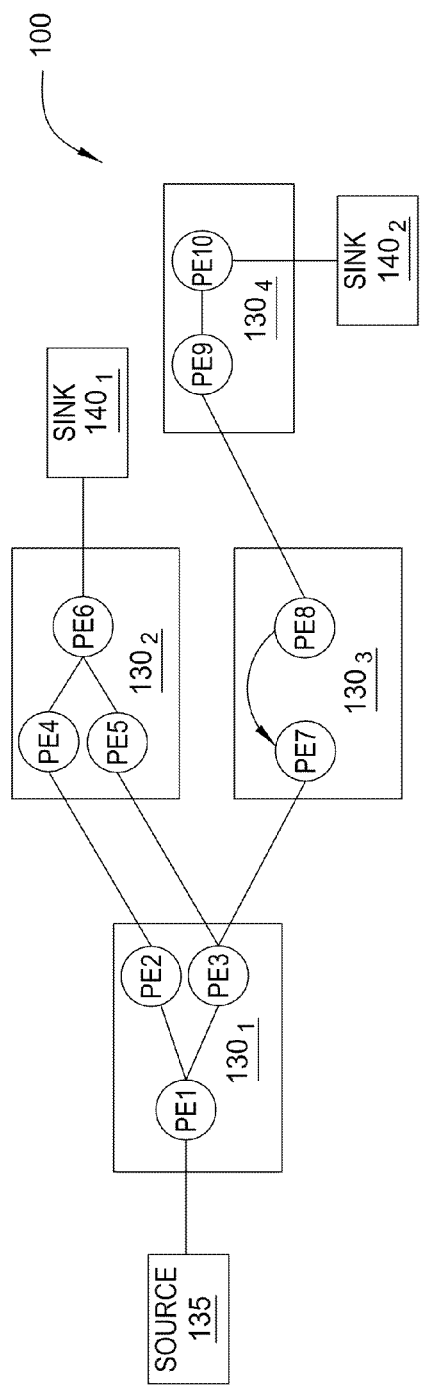

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from of one or more source processing elements (PEs) through to one or more sink PEs. The operator graph 132 is configurable to add or remove one or more PEs based on the data processing needs and scalability. Data elements flow into a source PE of a stream application and are processed by that PE.

Typically, processing elements receive an N-tuple (also referred to as "tuple" herein) of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on a received N-tuple, including, e.g., writing to database tables or performing other database operations such as data joins, splits, reads, etc., as well as performing other data analytic functions or operations. In one embodiment, the management system 105 may also include a user interface that allows a user to configure the operator graph 132 and the compute nodes $130_{1-4}$. The term "N-tuple" or "tuple" as used herein means a unit of data analogous to one record in a database. Further, as noted above, the monitoring application may observe how the user interacts with the operator graph and, in response, modify the stream application, or increase (or decrease) the amount of information presented to the user.

The user interface may be used to load programming instructions and configurations to be executed by the compute nodes $130_{1-4}$. A monitoring system 110 may also be included in the computing infrastructure 100 to monitor data processing components of the stream application. Further, even though the monitoring system 110 is shown as a single computing system, the monitoring system 110 may be a cluster of a plurality of computing resources, which may be distributed in the network 120. The monitoring system 110 is configured to communicate with compute nodes $130_{1-4}$. The monitoring system 110 may also be configured to communicate with the management system 105. In one embodiment, operations of the monitoring system 110 are tied to user interactivity on a user interface of the monitoring system 110.

The stream manager 134 may be configured to control a stream application running on the compute nodes $130_{1-4}$ as well as change the structure of the operator graph 132. For example, the stream manager 134 may be configured for moving processing elements (PEs) from one compute node 130 to another, e.g., to manage the processing loads of the compute nodes 130 in the computing infrastructure 100. Further, the stream manager 134 may control the stream application by inserting, removing, or otherwise modifying the processing elements (or what data-tuples flow to the processing elements) running on the compute nodes $130_{1-4}$.

FIG. 1B illustrates an example operator graph 132 that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source PE 135 (labeled as PE1) and ends at sink PEs $140_{1-2}$ (labeled as PE6 and PE10). Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation for combining tuples received from PE4 and PE5. This example operator graph also shows data tuples flowing from PE3 to PE7 on compute node $130_3$, which itself shows data tuples flowing to PE8 and looping back to PE7.

Data tuples emitted from PE8 flow to PE9 on compute node $130_4$, which emits tuples processed by sink PE10 $140_2$. Sinks 140 may be configured to perform further processing on incoming data tuples. Sinks 140 may also be configured to send data tuples to other applications in the computing infrastructure 100. Further, sinks 140 may also be configured to maintain process logs and audit trail of incoming data tuples. Alternatively, depending on a particular configuration and requirements of a data processing application, sinks 140 may also be configured to dispose the incoming data without performing any processing. In one or more embodiments, PEs may be configured to transform incoming data tuples by either adding or removing one or more data attributes before emitting outgoing data tuples to other PEs, as per the configuration of target PEs. It may be noted that when a tuple is bifurcated to be processed by more than one processing elements, a unique identification may be affixed to all bifurcated tuples so that the data in the bifurcated tuples may be combined or related when a need arises during further processing, retrieval or storage of information related to the original data tuple.

In one embodiment, incoming data tuples are configured to include a set of attributes and PEs are arranged in an interconnected network of processing elements to provide processing of one or more included attributes. For example, the operator graph 132 may be created based on known attribute processing characteristics of a plurality of available processing elements in the computing infrastructure 100 vis-à-vis included attributes in incoming data tuples.

Figure 2:
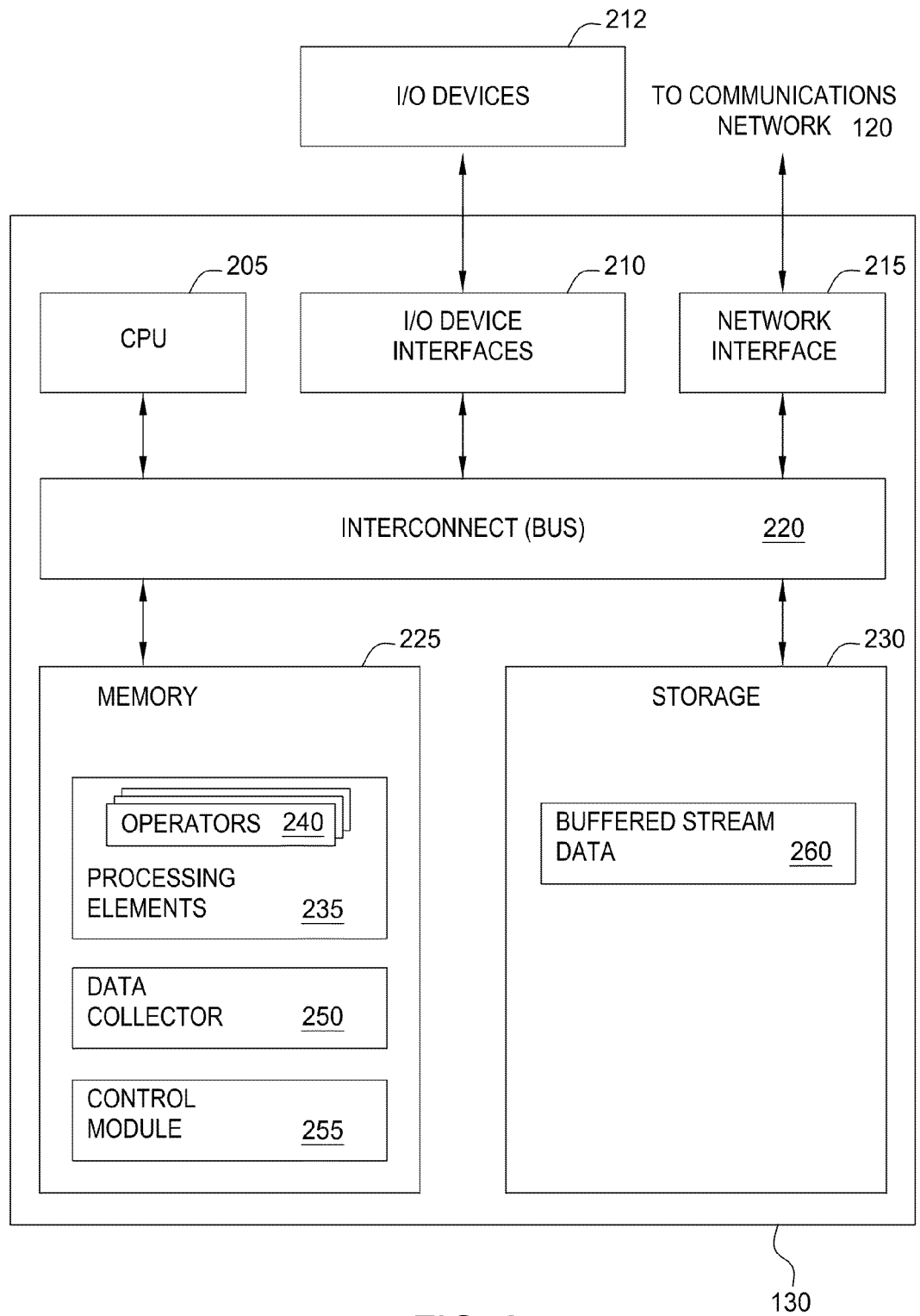
FIG. 2 is a more detailed logical view of a distributed computing node of FIG. 1, according to one embodiment of the present invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130. The compute node 130 may be a physical host or a virtual machine. A virtual machine provides a software abstraction of computing resources of a physical host computer. With a deployment of virtualization software, a physical host may be configured to host a plurality of virtual machines, which may share hardware resources of the physical host. Typically, a virtual machine runs as an independent computer system. Various technologies are available to live migrate a virtual machine from one physical host to another while the virtual machine is still running, spawn more virtual machines on the fly, etc. In one embodiment, processing nodes and the management server may be hosted in a virtualized computing environment to provide well known advantages of virtualized computing infrastructure including another layer of scalability and fault tolerance.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes one or more processing elements (PEs) 235, a data collector module 250 and a control module 255. Other processing modules may be loaded in the memory 225 to configure the processing node 130 to adapt to particular types of data processing needs. The PEs 235 includes a collection of operators 240. Each operator 240 may provide a small chunk of executable code configured to process data flowing into a processing element (e.g., PEs 235) and to emit data to other operators 240 in a PE and to other PEs in the stream application as described by the operator graph 132. In one embodiment, a processing element (PE) may include a plurality of simultaneously active operators 240, each of which may be configured to receive data traffic at a different incoming port of the PE. In another embodiment, only one (or a limited number) of the operators 240 is active at a given time. In such an embodiment, the PE may be configured to invoke a pre-configured operator when a particular type of tuple is received or when a particular type of data processing is needed on a particular type of attribute in an incoming tuple (for example, when an operator needs to get composite data parsed, the operator may invoke another operator that is pre-configured to provide the needed parsing). The other PEs may be on the same compute node 130 or on other compute nodes accessible over the data communications network 120. The data collector 250 collects pre-configured statistics of data that flows through operators 240 and other processing modules of a compute node 130. For example, the data collector 250 may collect tuple rates at different pre-configured intervals. The data collector 250 may also separately collect tuple rates at inputs and outputs of operators 240. The monitoring system 110 may be configured to interact with the data collector 250 either continuously or at pre-configured intervals to retrieve data from the data collector 250. The retrieved data is then stored at a database or memory cache coupled to the monitoring system 110.

The control module 255 may be included in the compute node 130 to enable the monitoring module 110 to configure the computer node 130 based on the occurrence and detection of pre-configured conditions in the computer node 130. For example, during the monitoring of a stream application, if the monitoring system 110 determines that more processing elements 235 or operators 240 need to be added, the monitoring system 110 may send a message to the control module 255 to effect the desired change in the computer node 130.

Buffered stream data 260 represents a storage space for data flowing into the compute node 105 from upstream processing elements (or from a data source for the stream application). For example, buffered stream data may include data tuples waiting to be processed by one of the PEs 235. Buffered stream data 260 may also store the results of data processing performed by PEs 235 that will be sent to downstream processing elements (or load shed).

Figure 3:
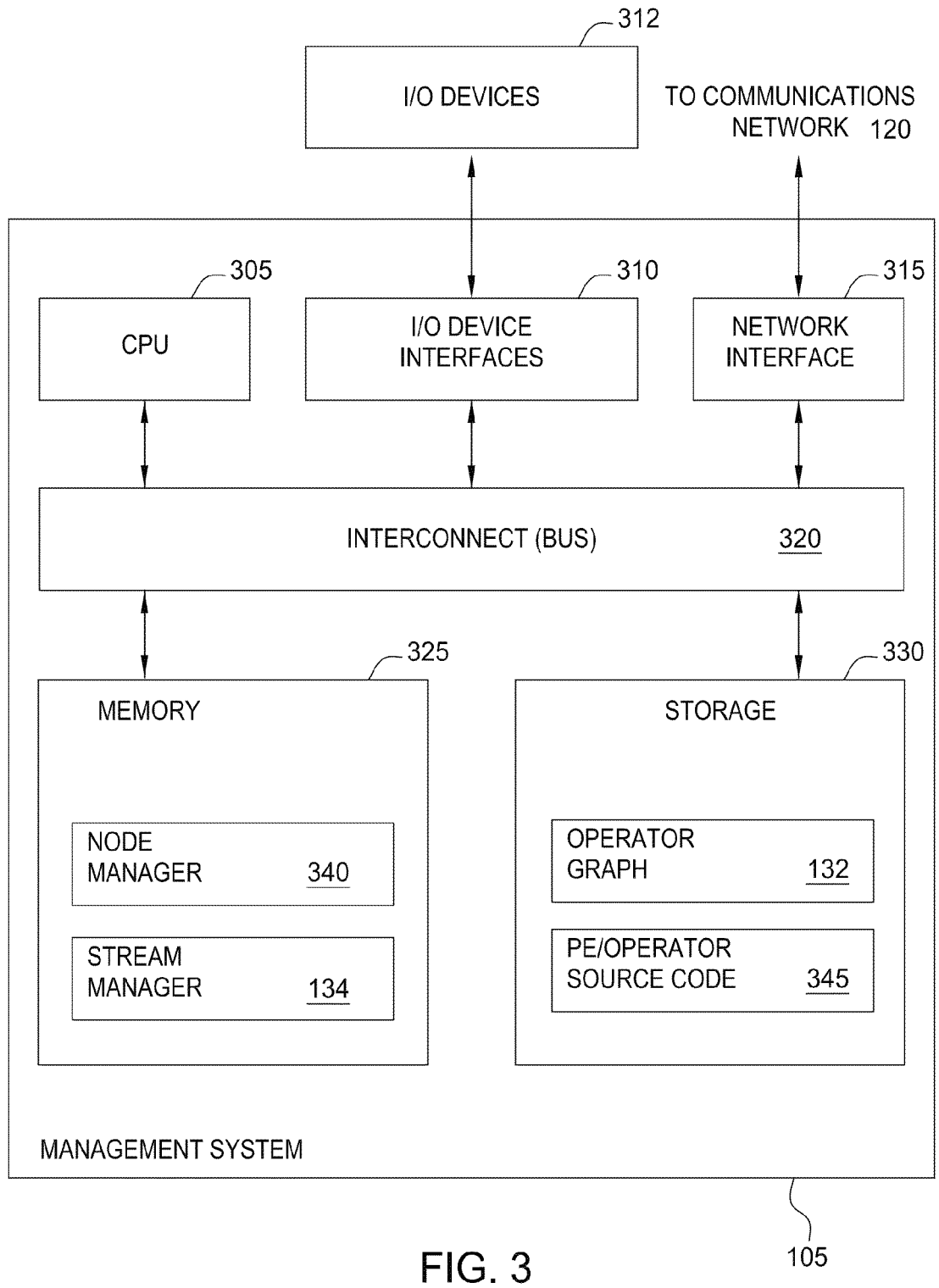
FIG. 3 is a more detailed logical view of a management computing system in a stream application, according to one embodiment of the present invention.

FIG. 3 is a more detailed view of the management system 105 of FIG. 1, according to one embodiment of the present invention. As shown, the management system 105 includes, without limitation, a central processing unit (CPU) 305, a network interface 315, an interconnect 320, a memory 325, and storage 330. The management system 105 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a node manager 340 and a stream manager 134. The storage 330 also includes the operator graph 132. The node manager 340 may be used to configure the compute nodes 130 with respect to loading programming instructions and related configurations, assigning or reassigning processing elements on different compute nodes 130, etc. The node manager 340 may also be used for setting up one or more processing elements and operators in the compute nodes 130. The processing elements 235 and operators 240 setup may include configuring each processing element and operator to process particular type of streaming data attributes, accept the streaming data in a particular format and emit the streaming data in another particular format, which may be the same or different from the data format of incoming data tuples. More than one processing elements 235 and/or operators 240 may be used in parallel to process same type of data to increase data throughput. In one embodiment, the monitoring system 110 may interact with the node manager 340 to instruct the management system 105 to spawn more process nodes 130 to process certain type of data when the monitoring system 110 determines a need based on a detection of performance issues with a computer node 130 or the processing elements 235 in a computer node 130. The monitoring system 110 may also interact with the node manager 340 to instruct the management system 105 to move processing elements 235 from one computer node 130 to another to improve the data processing performance of the stream application.

The stream manager 134 may be used to monitor the data stream as it flows through the processing elements in a stream application. The stream manager 134 may also maintain logging and audit trails of the streaming data as the streaming data is processed by the compute nodes 130. In one embodiment, the stream manager 134 may be used to instruct processing elements to send a particular type of data to the monitoring system 110 based on occurrences of pre-configured events. The storage 330 includes storage for operator graph 132. As noted above, the operator graph 132 maintains the connectivity configuration of a plurality of compute nodes and processing elements in a streaming application. In one embodiment, the processing element and operator source code 345 may also be stored in the storage 330. The processing element and operator source code 345 is loaded to setup the processing elements 235 and the operators 240 in the compute nodes 130.

The management system 105 may include a user interface to enable configuration and storage of trigger rules and trigger conditions. The user interface may also be used for building the operator graph 132 (that is, to configure and network the processing elements to suit a particular streaming application). Moreover, as noted above, the user interface may also be used to load programming instructions in each of the processing elements in the operator graph 132.

Figure 4:
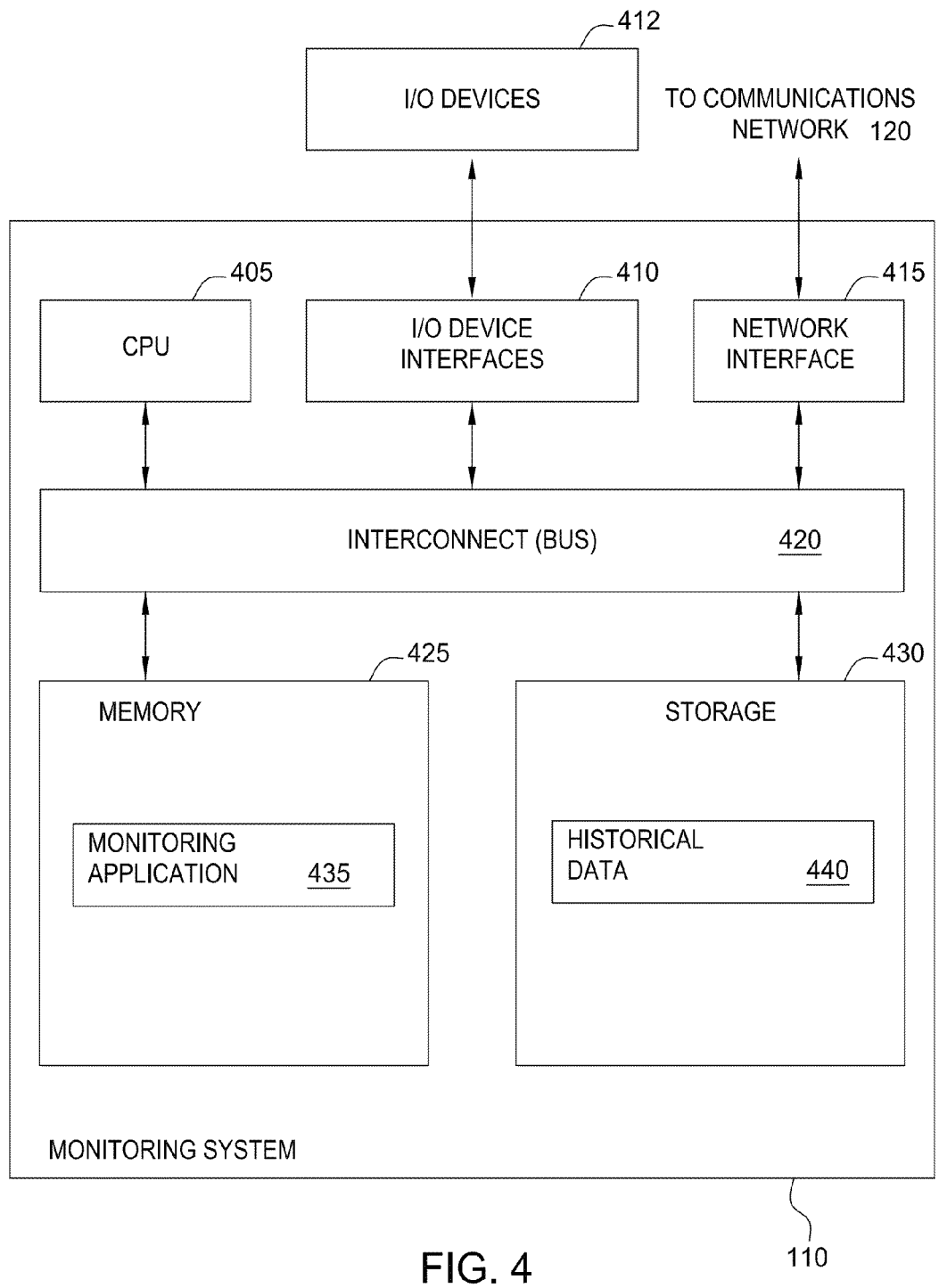
FIG. 4 is a more detailed logical view of a stream application monitoring system, according to one embodiment of the present invention.

FIG. 4 is a more detailed logical view of a stream application monitoring system 110, according to one embodiment of the present invention. As shown, the management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the management system 105.

Like CPU 305 of FIG. 3, CPU 405 is configured to retrieve and execute programming instructions stored in the memory 425 and storage 430. Similarly, the CPU 405 is configured to store and retrieve application data residing in the memory 425 and storage 430. The interconnect 420 is configured to move data, such as programming instructions and application data, between the CPU 405, I/O devices interface 410, storage unit 430, network interface 405, and memory 425. Like CPU 305, CPU 405 is included to be representative of a single CPU, multiple CPUs, a single CPU having multiple processing cores, and the like. Memory 425 is generally included to be representative of a random access memory. The network interface 415 is configured to transmit data via the communications network 120. Although shown as a single unit, the storage 430 may be a combination of fixed and/or removable storage devices, such as fixed disc drives, removable memory cards, optical storage, SSD or flash memory devices, network attached storage (NAS), or connections to storage area-network (SAN) devices.

As shown, the memory 425 stores a monitoring application 435. The storage 430 includes historical data 440. The monitoring application 435 may be used to monitor performance of processing elements (PEs) based on user interactions with the user interface of the monitoring application 435. The monitoring application may also be configured to configure the compute nodes 130 with respect to assigning or reassigning processing elements on different compute nodes 130, spawning new processing elements 235, operators 240, etc. The monitoring application 435 may also be configured to interact with process nodes 130 to increase or decrease priorities of running processes or jobs.

The historical data 440 may include data retrieved from the data collector 250. The historical data 440 may also include data that is collected by the monitoring system 110. In one embodiment, the historical data 440 may include tuple rates at each processing element in the stream application. The historical data 440 may also include more detailed data such as tuple rate at each input and output port of each operators 240 in a processing element (PE). In one embodiment, the historical data 440 may include only averages of tuple rates in a pre-configured time intervals. For example, the historical data 440 may arrange the data in formats such as "average tuple rate at the input of PE1 within the last one hour" and the like.

Figure 5:
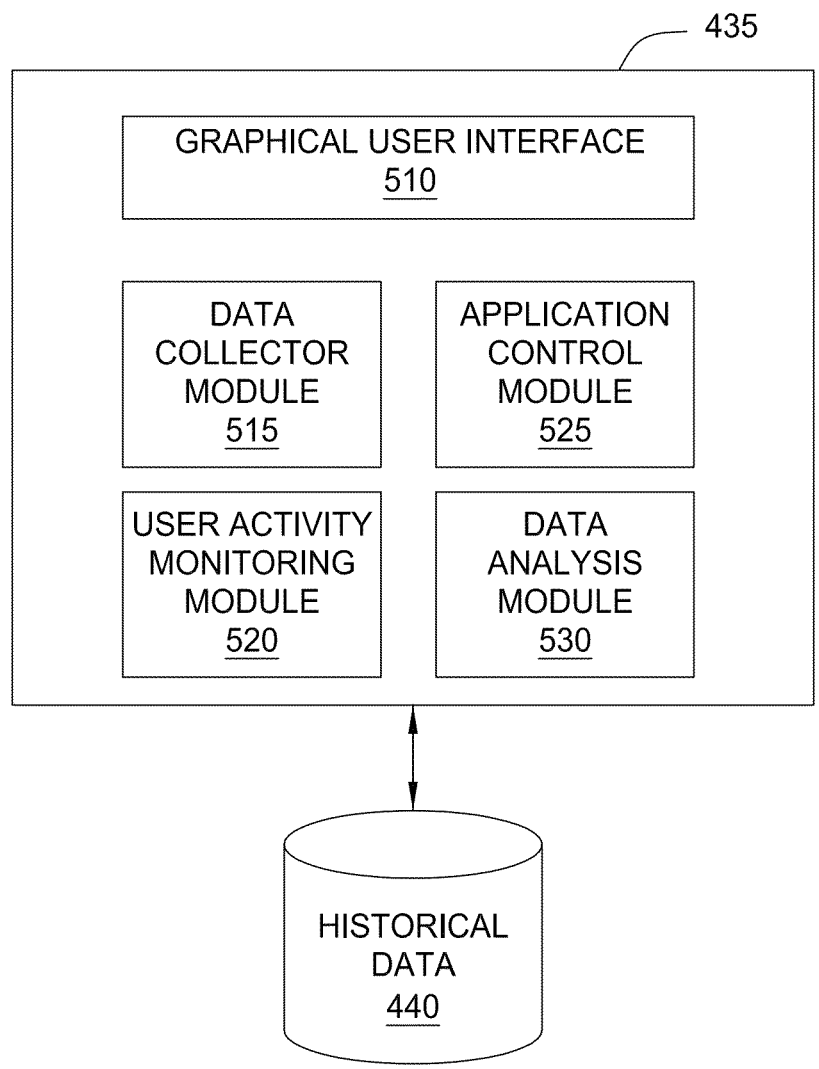
FIG. 5 is a schematic diagram of a monitoring application, according to one embodiment of the present invention.

FIG. 5 is a schematic diagram of the monitoring application 435, according to one embodiment of the present invention. As shown, the monitoring application 435 includes a graphical user interface (GUI) 510. The GUI 510 may be configured to depict the operator graph 132 of a selected stream application. In one embodiment, the GUI 510 may display the interconnected computer nodes 130 and processing elements (PEs) as shown in FIG. 1B. The GUI 510 may also be configured to depict a more detailed diagram of the interconnected computer nodes 130 and processing elements (PEs), as for example, operators 240 of each PE may also be shown in the GUI 510.

In one embodiment, the stream application may be modified either automatically or in response to user-prompts based off of the way the user interacts with the graphical representation of the operator graph presented in the GU 510. The graphical representation of the operator graph may present not only how the job's PEs are connected to each other but may also allow the user to access logs, parts of a log and performance metrics associated with the processing elements. A user may interact with the GUI 510 to view the operations of one of the selected operators 240 within a PE (or the connections between PEs). The GUI 510 may also be configured to display configurations of PEs (for example, which attributes of incoming data tuples are to be processed by a selected PE, etc.). A log file of a selected PE may also be viewed in the GUI 250. The log file of a selected PE typically includes pre-configured data related to the data processing of data tuples at the selected PE. Also, as shown, the monitoring application 435 is coupled to the historical data 440.

The monitoring application 435 may include a data collector module 515. The data collector module 515 is configured to interact with the data collector 255 of compute nodes 130 to retrieve the historical data related to each processing element 235 and operator 240 from each compute node 130. The data collector module 515 may be configured to arrange the retrieved data in a pre-configured arrangement and to keep the data up-to-date. The data collector module 515 is coupled to the historical data 440 to persistently store the retrieved data.

The monitoring application 435 may also include a user activity monitoring module 520 to capture user interactions with the GUI 510. An application control module 525 may be included to send messages or commands to compute nodes 130 and/or the management system 105 for reconfiguration of the processing modules of the stream application based on user interactivity in the GUI 510. A data analysis module 530 may be included to analyze the current tuple processing rates at a selected PE in view of the historical data of tuple processing rates at the selected PE. Note that the operations of the monitoring application 435 are being described using data tuple rates for example only. For example, processing errors in a selected PE or operator may also be a factor on which the monitoring application 435 may act and reconfigure the processing modules of the stream application.

In one example, when a user selects a depiction of a processing element in the GUI 510, the processing application 435 displays a log file associated with the selected processing element. The monitoring application 435 may be configured to retrieve the historical tuple processing data from the historical data 440 when a processing element in selected in the GUI 510 and analyze the current tuple processing rates with a selected arrangement of the historical tuple processing rates. For example, if the selected processing element is receiving 100 tuples per second at the input but only producing 30 tuples at the output, the data analysis module 530 may compare these rates with the historical processing rates (or historical processing averages) to determine if there is any issue with the selected processing element. If for example, the selected processing element in the last one hour was processing on an average 70 tuples, the current processing of 30 tuples per second may be an indication of performance issues with the selected processing element. After the monitoring application 435 determines that there may be some processing issues at the selected processing element, the monitoring application 435 may interact with the selected processing element to determine if adding more operators 240 may remedy the issue. Alternatively, the monitoring application 435 may interact with the computer node 130 in which the selected processing element is running to determine if adding more processing elements to process the same type of data as being processed by the selected processing element may remedy the issue. The monitoring application 435 may also interact with the management system 105 to determine if rearranging some processing elements on computer nodes 130 may remedy the issue. For example, if the CPU 205 of a compute node 130 is performing at a very high rate, some processing elements may be moved to other compute nodes of the stream application.

In one embodiment, the GUI 510 may be configured to continuously monitor the current tuple processing rates at various processing elements and compare the current tuple processing rates with the historical tuple processing rates. And, if the monitoring application 435 determines that the current tuple processing rates are outside a pre-configured range, the GUI 510 may notify the user (e.g., through and alert, or change of color of the processing element in question on the display, etc.). In one embodiment, the monitoring application 435 may employ corrective measures automatically when a discrepancy in tuple processing rates is found. However, in another embodiment, the corrective measures are only employed when the user selects the processing element in question in the GUI 510 rather than automatically employing the corrective measure (because some processing discrepancies may be due to good reasons and automatically employing corrective measure may result in unintended results and reduced overall system performance).

The monitoring application 435 may include functionality to store user configurations to handle particular types of discrepancies in the tuple processing rates. For example, the user may create custom configurations for various possible tuple processing discrepancies (e.g., if the current tuple processing rate is 10% away from the historical average tuple processing rate, add one operator in the processing element in question, etc.).

Figure 6:
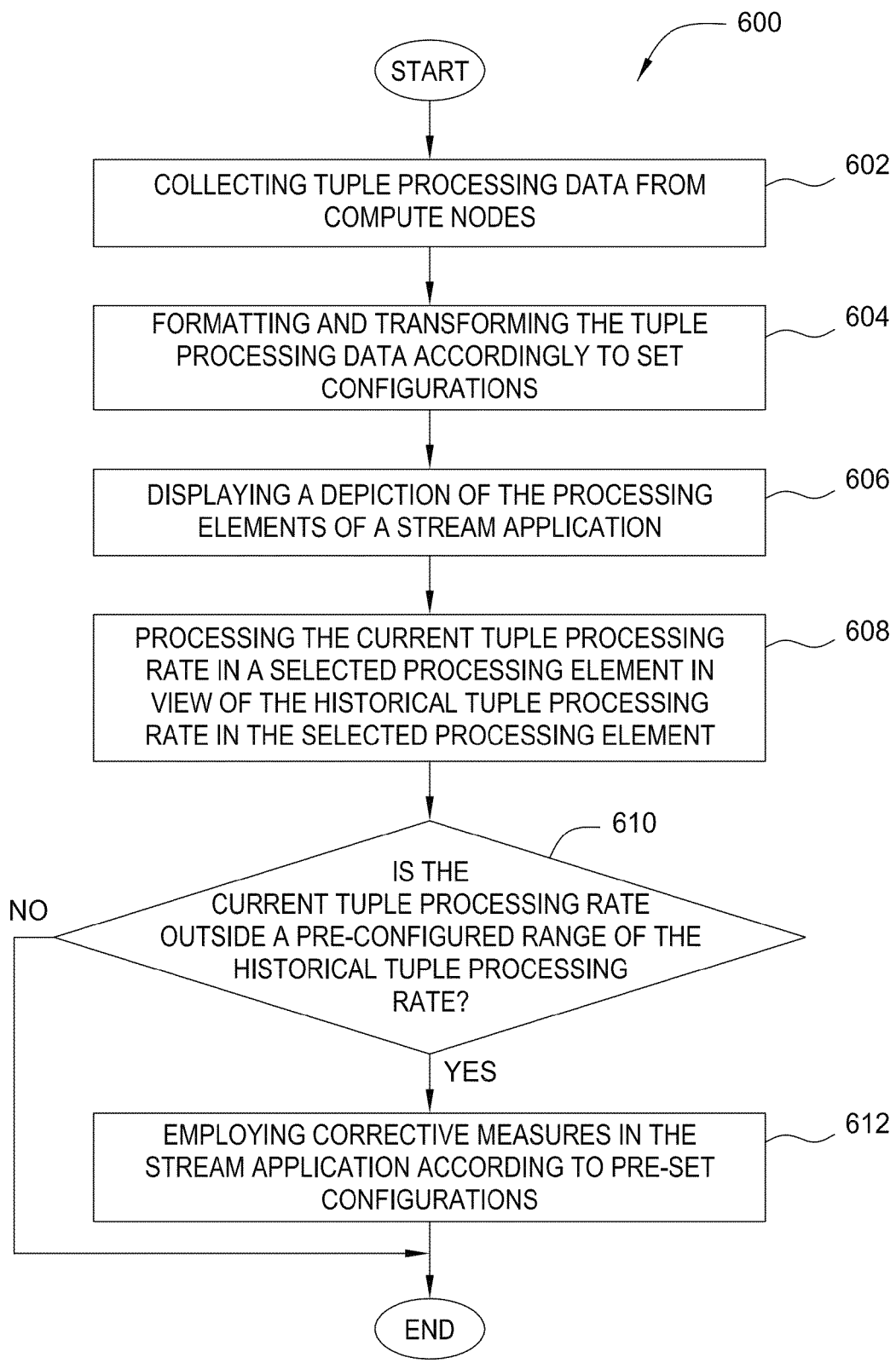
FIG. 6 illustrates a flow diagram of method steps for monitoring and adjusting a stream application, according to one embodiment of the present invention.

FIG. 6 illustrates a flow diagram 600 of method steps for monitoring a stream application, according to one embodiment of the present invention. At step 602, individual compute nodes 130 collects tuple processing data from each processing element 235, including operators 240. Compute nodes 130 then transfer this collected data at pre-configured intervals to the monitoring system 110, which persistently stores the collected data. The collected data may be retained in a cache at compute nodes 130 until the collected data is transferred to the monitoring system 110. The cache at a compute node 130 may be flushed after transferring the collected data to the monitoring system 110. At the monitoring system 110, in one embodiment, the collected data may be stored in a database or in a file. In other embodiments, the monitoring system 110 may cache the collected data in memory 425. The collected data may include tuple rates at each inputs and outputs of each of the operators 240 of processing elements (PEs of FIG. 1B). As noted above, other types of data may also be collected according to configurations of the monitoring system 110. In one embodiment, a user configures the monitoring system 110 with regards to the type of data to be collected. The monitoring system 110 configures compute nodes 130 to collect the data accordingly. Note that the granularity of the collected data is configurable by a user or may be set to variable based on occurrences of pre-configured events.

At step 604, the monitoring system 110 formats and transforms the collected data according to pre-set configurations. For example, the collected data may be formatted according to the requirements of a database, which may be used for persistently storing the data (e.g., if the database is a relational database, the collected data is formatted to be stored in tabular format). The monitoring system 110 may transform the collected data accordingly to pre-set configurations. For example, average tuple rates within a pre-configured time intervals (e.g., average tuple rate in the last one hour at the input of PE1). The transformed collected data is stored either in a database or in the memory 425.

At step 606, PEs of the stream application are depicted and displayed in the GUI 510 of the monitoring application 435. As noted above, the operator graph 132 of the stream application includes PEs (and operators) and their interconnections. Note that method steps described in steps 602 and 604 are performed independent of the displaying of the operator graph 132. In other words, the monitoring system 110 may continue to collected data from compute nodes 130 while step 606 is being performed.

At step 608, a user may select a selected processing element in the GUI 510. In one example, the user may be looking at the operator graph 132 of running code. As noted above, since the monitoring system 110 may still be receiving tuple processing data from the selected processing element, this currently received tuple processing data is processed against the historical tuple processing data that was received and transformed in step 604. Further, as noted above, the monitoring system 110 may also monitor user interactions with the presentation of the portion of the operator graph presented on the graphical user interface display, i.e., with the selected processing element displayed in the GUI 510. In one embodiment, the granularity of the collected data (step 602) may be automatically increased for the selected operator or processing element being visualized or interacted with in the GUI 510.

At decision step 610, the monitoring system 110 determines if the current tuple processing rate is outside a pre-configured range based on the historical tuple processing rate averages. If the current tuple processing rate is within the pre-configured range, then no further action is taken. However, if the current tuple processing rate is above or below the pre-configured tuple processing rate, the monitoring system 110 may take pre-configured corrective actions by sending messages or commands to at least one of compute nodes 130 and the management system 105. The corrective measures may include adjusting the run-time priority of a particular processing job in the stream application to bring the current tuple processing rates within the pre-configured range, as noted above.

In another embodiment, when the monitoring system 110 is configured to consider a collaboration of interactions of multiple users on a selected processing element in the GUI 510, the monitoring system 110 when identifying a modification to the stream application. In one embodiment, besides adjusting an operator's priority up or down based on the comparison between the current tuple processing rates and historical averages, as configured, the monitoring system 110 may perform more complex streaming type operations automatically based on how an operator, set of operators, or set of processing elements was visualized/interacted with by either one or multiple users in the GUI 510. These complex operations may include automatic adjustment of an operator within compute nodes 130, automatic fusion or separation of operators, automatic duplication of an operator, spawning new compute nodes, duplicating a compute node, spawning new processing elements, etc.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing a stream application, the stream application composed from a plurality of processing elements executing on one or more compute nodes, the method comprising:
   generating a graphical user interface display presenting at least a portion of an operator graph defining a structure of the stream application, wherein the operator graph represents the plurality of processing elements, and links between processing elements, corresponding to a flow of data tuples through the stream application, wherein the processing state includes a current tuple processing rate for at least one processing element;
   monitoring, by operation of an application executed on a processor, user interactions with the presentation of the portion of the operator graph on the graphical user interface display;
   identifying at least a first modification to the stream application based on a processing state of the stream application and the monitored user interactions, wherein the first modification comprises modifying a logging level of at least one of the processing elements; and
   implementing the modification to the stream application.

2. The method of claim 1, wherein the first modification to the stream application comprises adjusting the computing resources made available to one of the processing elements in the stream application.

3. The method of claim 1, wherein the monitored user interactions include monitoring a log file associated with a processing element accessed through the graphical user interface.

4. The method of claim 1, wherein the current processing rate is compared to a historical processing rate for the at least one processing element.

5. The method of claim 1, wherein the first modification to the stream application comprises at least one of an adjustment to an operator in one of the processing elements, fusing two or more processing elements, separating a first processing element into to two or more processing elements, and cloning one of the processing elements; and wherein the method further comprises, updating the graphical user interface display presenting the portion of the operator graph to reflect the first modification.

6. The method of claim 1, further comprising:
   prior to implementing the first modification to the stream application, issuing a prompt to accept the first modification.

7. A non-transitory computer-readable storage medium containing a program which, when executed, performs an operation of monitoring a stream application, the stream application composed from a plurality of processing elements executing on one or more compute nodes, the operation comprising:
   generating a graphical user interface display presenting a user with at least a portion of an operator graph defining a structure of the stream application, wherein the operator graph represents the plurality of processing elements, and links between processing elements, corresponding to a flow of data tuples through the stream application, wherein the processing state includes a current tuple processing rate for at least one processing element;
   monitoring user interactions with the presentation of the portion of the operator graph on the graphical user interface display;
   identifying at least a first modification to the stream application based on a processing state of the stream application and the monitored user interactions, wherein the first modification comprises modifying a logging level of at least one of the processing elements; and
   implementing the modification to the stream application.

8. The computer-readable storage medium of claim 7, wherein the first modification to the stream application further comprises adjusting the computing resources made available to one of the processing elements in the stream application.

9. The computer-readable storage medium of claim 7, wherein the monitored user interactions include monitoring a log file associated with a processing element accessed through the graphical user interface.

10. The computer-readable storage medium of claim 7, wherein the first modification to the stream application further comprises at least one of an adjustment to an operator in one of the processing elements, fusing two or more processing elements, separating a first processing element into to two or more processing elements, and cloning one of the processing elements; and wherein the method further comprises, updating the graphical user interface display presenting the portion of the operator graph to reflect the first modification.

11. The computer readable storage medium of claim 7, wherein the operation further comprises:
   prior to implementing the first modification to the stream application, issuing a prompt to accept the first modification.

12. A system, comprising:
   a plurality of compute nodes, each comprising a processor and a memory, wherein the compute nodes are configured to execute processing elements of a stream application; and
   a management system comprising at least a processor and a memory, wherein the memory stores a monitoring application, which, when executed on the management system performs an operation for monitoring the stream application, the operation, comprising:
      generating a graphical user interface display presenting a user with at least a portion of an operator graph defining a structure of the stream application, wherein the operator graph represents the plurality of processing elements, and links between processing elements, corresponding to a flow of data tuples through the stream application, wherein the processing state includes a current tuple processing rate for at least one processing element;
      monitoring user interactions with the presentation of the portion of the operator graph on the graphical user interface display;
      identifying at least a first modification to the stream application based on a processing state of the stream application and the monitored user interactions, wherein the first modification comprises modifying a logging level of at least one of the processing elements; and implementing the modification to the stream application.

13. The system of claim 12, wherein the first modification to the stream application further comprises adjusting the computing resources made available to one of the processing elements in the stream application.

14. The system of claim 12, wherein the monitored user interactions include monitoring a log file associated with a processing element accessed through the graphical user interface.

15. The system of claim 12, wherein the first modification to the stream application further comprises at least one of an adjustment to an operator in one of the processing elements, fusing two or more processing elements, separating a first processing element into to two or more processing elements, and cloning one of the processing elements; and wherein the method further comprises, updating the graphical user interface display presenting the portion of the operator graph to reflect the first modification.

16. The system of claim 12, wherein the operation further comprises:

prior to implementing the first modification to the stream application, issuing a prompt to accept the first modification.

\* \* \* \* \*